US012549534B2

(12) United States Patent
Krishnaiah

(10) Patent No.: US 12,549,534 B2
(45) Date of Patent: Feb. 10, 2026

(54) OPTIMIZING TOKENS FOR IDENTITY PLATFORMS

(71) Applicant: PayPal, Inc., San Jose, CA (US)

(72) Inventor: Akshay Sanjeevaiah Krishnaiah, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 560 days.

(21) Appl. No.: 17/564,058

(22) Filed: Dec. 28, 2021

(65) Prior Publication Data

US 2022/0200982 A1 Jun. 23, 2022

Related U.S. Application Data

(63) Continuation of application No. 14/979,866, filed on Dec. 28, 2015, now Pat. No. 11,316,844.

(Continued)

(51) Int. Cl.

*H04L 9/40* (2022.01)
*G06Q 20/36* (2012.01)
*G06Q 20/40* (2012.01)

(52) U.S. Cl.

CPC ..... *H04L 63/0815* (2013.01); *G06Q 20/3674* (2013.01); *G06Q 20/4014* (2013.01); *H04L 63/0861* (2013.01); *G06Q 2220/00* (2013.01)

(58) Field of Classification Search

CPC ............ H04L 63/0815; H04L 63/0861; G06Q 20/3674; G06Q 20/4014; G06Q 2220/00

See application file for complete search history.

(56) References Cited

U.S. PATENT DOCUMENTS 6,523,041 B1 * 2/2003 Morgan .............. G06F 16/2445 707/999.102
8,131,745 B1 * 3/2012 Hoffman ................ G06Q 50/01 707/766

(Continued)

FOREIGN PATENT DOCUMENTS

EP 3696708 A1 * 8/2020 ............... H04L 9/50
KR 102589543 B1 * 10/2023 ........... H04L 9/3234

OTHER PUBLICATIONS

Bonneau J., et al., "The Quest to Replace Passwords: A Framework for Comparative Evaluation of Web Authentication Schemes", UCAM Computer Laboratory, Retrieved from Internet URL: https://www.cl.cam.ac.uk/techreports/UCAM-CL-TR-817.pdf, Mar. 2012, 32 pages.

(Continued)

*Primary Examiner* — John W Hayes
*Assistant Examiner* — Edgar R. Martinez-Hernandez
(74) *Attorney, Agent, or Firm* — HAYNES AND BOONE, LLP

(57) ABSTRACT

The present disclosure is directed to generating cross-platform electronic tokens. First information of a first user associated with a first identity platform is accessed. Second information of a second user associated with a second identity platform is accessed. The second identity platform is different from the first identity platform. The first information and the second information are analyzed to determine whether the first user and the second user are the same person. In response to a determination that the first user and the second user are the same person, a cross-platform electronic token is generated to be used for both the first identity platform and the second identity platform.

20 Claims, 8 Drawing Sheets

Related U.S. Application Data

(60) Provisional application No. 62/208,885, filed on Aug. 24, 2015.

(56) References Cited

U.S. PATENT DOCUMENTS

| | | | | |
|---|---|---|---|---|
| 8,171,531 | B2 * | 5/2012 | Buer | H04W 12/069 380/278 |
| 8,275,995 | B2 * | 9/2012 | Jobmann | G06F 21/34 713/185 |
| 8,316,389 | B2 * | 11/2012 | Wong | H04N 21/47214 725/24 |
| 8,327,141 | B2 | 12/2012 | Vysogorets et al. | |
| 8,793,487 | B2 * | 7/2014 | Epstein | H04L 63/0823 713/157 |
| 8,819,795 | B2 * | 8/2014 | Hitchcock | G06F 21/41 726/17 |
| 8,826,019 | B2 | 9/2014 | Shablygin et al. | |
| 8,831,994 | B1 * | 9/2014 | Hoffman | G07C 9/38 705/50 |
| 9,946,558 | B2 * | 4/2018 | Mitsuyu | G06F 9/44589 |
| 10,853,773 | B2 * | 12/2020 | Feder | G06Q 20/102 |
| 11,159,578 | B1 * | 10/2021 | McCown | G06F 21/64 |
| 2003/0229783 | A1 * | 12/2003 | Hardt | H04L 63/102 713/155 |
| 2004/0139028 | A1 * | 7/2004 | Fishman | G06Q 20/40145 713/172 |
| 2007/0143851 | A1 * | 6/2007 | Nicodemus | H04L 63/1433 726/4 |
| 2008/0082434 | A1 * | 4/2008 | Qian | G06Q 20/02 705/40 |
| 2010/0057586 | A1 * | 3/2010 | Chow | G06Q 30/0623 705/26.1 |
| 2011/0125613 | A1 * | 5/2011 | Franchi | G06F 21/32 726/9 |
| 2011/0238579 | A1 * | 9/2011 | Coppinger | G06Q 20/40 705/67 |
| 2012/0310829 | A1 * | 12/2012 | Paulsen | H04L 63/168 726/28 |
| 2012/0331516 | A1 * | 12/2012 | Perez Martinez | H04L 63/168 726/1 |
| 2013/0042110 | A1 * | 2/2013 | Shablygin | G06F 21/34 713/168 |
| 2013/0332344 | A1 * | 12/2013 | Weber | G06Q 20/385 705/39 |
| 2013/0332838 | A1 * | 12/2013 | Naggar | G06Q 30/0605 715/733 |
| 2014/0047233 | A1 * | 2/2014 | Kalin | G06Q 20/385 713/155 |
| 2014/0129450 | A1 * | 5/2014 | Priebatsch | G06Q 20/34 705/44 |
| 2015/0072715 | A1 * | 3/2015 | Ireland | H04L 12/1859 455/466 |
| 2015/0101032 | A1 * | 4/2015 | Shimakawa | G06F 21/62 726/8 |
| 2015/0172261 | A1 * | 6/2015 | Counterman | H04L 63/0815 726/5 |
| 2015/0180868 | A1 * | 6/2015 | Sng | H04L 63/0846 726/9 |
| 2015/0186478 | A1 * | 7/2015 | Yan | G06F 16/14 707/722 |
| 2015/0221153 | A1 * | 8/2015 | Dashiff | G07C 13/00 705/12 |
| 2016/0028550 | A1 * | 1/2016 | Gaddam | H04L 63/0823 713/173 |
| 2016/0162903 | A1 * | 6/2016 | Weiss | G06Q 20/3676 705/72 |
| 2016/0188898 | A1 * | 6/2016 | Karinta | G06F 11/1471 726/4 |
| 2017/0011393 | A1 * | 1/2017 | Hong | G06Q 20/409 |
| 2017/0149867 | A1 * | 5/2017 | Lee | H04W 12/06 |
| 2017/0255942 | A1 * | 9/2017 | Chandrasekaran | G06Q 20/40145 |
| 2018/0013745 | A1 * | 1/2018 | Zheng | G06Q 10/083 |
| 2019/0230092 | A1 * | 7/2019 | Patel | H04L 9/321 |
| 2020/0074102 | A1 * | 3/2020 | Pitti | G06F 21/602 |
| 2020/0356692 | A1 * | 11/2020 | Copsey | H04W 12/084 |

OTHER PUBLICATIONS

Mjolsnes S.F., et al., "On-Line E-Wallet System with Decentralized Credential Keepers", Kluwer Academic Publishers, Mobile Networks and Applications, vol. 08, 2003, 13 pages.

Qiu Z., et al., "A Cross-platform Mobile Payment Solution Based on Web Technology", 2012, 4 pages.

* cited by examiner

EVENTS

SESSIONS

SAME PERSON

TAGGING

ANALYTICS

FIG. 3

OPTIMIZING TOKENS FOR IDENTITY PLATFORMS

CLAIM OF PRIORITY

The present application is a continuation application of U.S. patent application Ser. No. 14/979,866, filed Dec. 28, 2015, and which claims benefit of provisional U.S. Patent Application No. 62/208,885, filed on Aug. 24, 2015, entitled "Optimizing Tokens for Identity Platforms", the disclosure of which is hereby incorporated by reference in its entirety.

BACKGROUND

Field of the Invention

The present invention generally relates to systems and methods for optimizing tokens for identity platforms.

Related Art

With the popularity of cross channel commerce (omnichannel), many payments are made across different channels (online, offline, mobile etc.). As the payment industry looks to a more secured method of transactions, tokenization has been implemented to protect end users' confidential financial information. However, there is a financial cost related to generating tokens. Currently, a different token needs to be generated for each identity platform (e.g., Facebook®, Microsoft®, Google®, Pinterest®, etc.), even if the end user is the same. This may become costly for the entity that is paying for the token generation.

Therefore, although existing systems and methods of tokenization are generally adequate for their intended purposes, they have not been entirely satisfactory in every aspect. What is needed is an optimized tokenization scheme where the same token can be used across different identity platforms for the same end user.

BRIEF DESCRIPTION OF THE FIGURES

FIG. 3 is a diagram illustrating a method of analyzing data gathered from identity platforms according to various aspects of the present disclosure.

Figure 1:
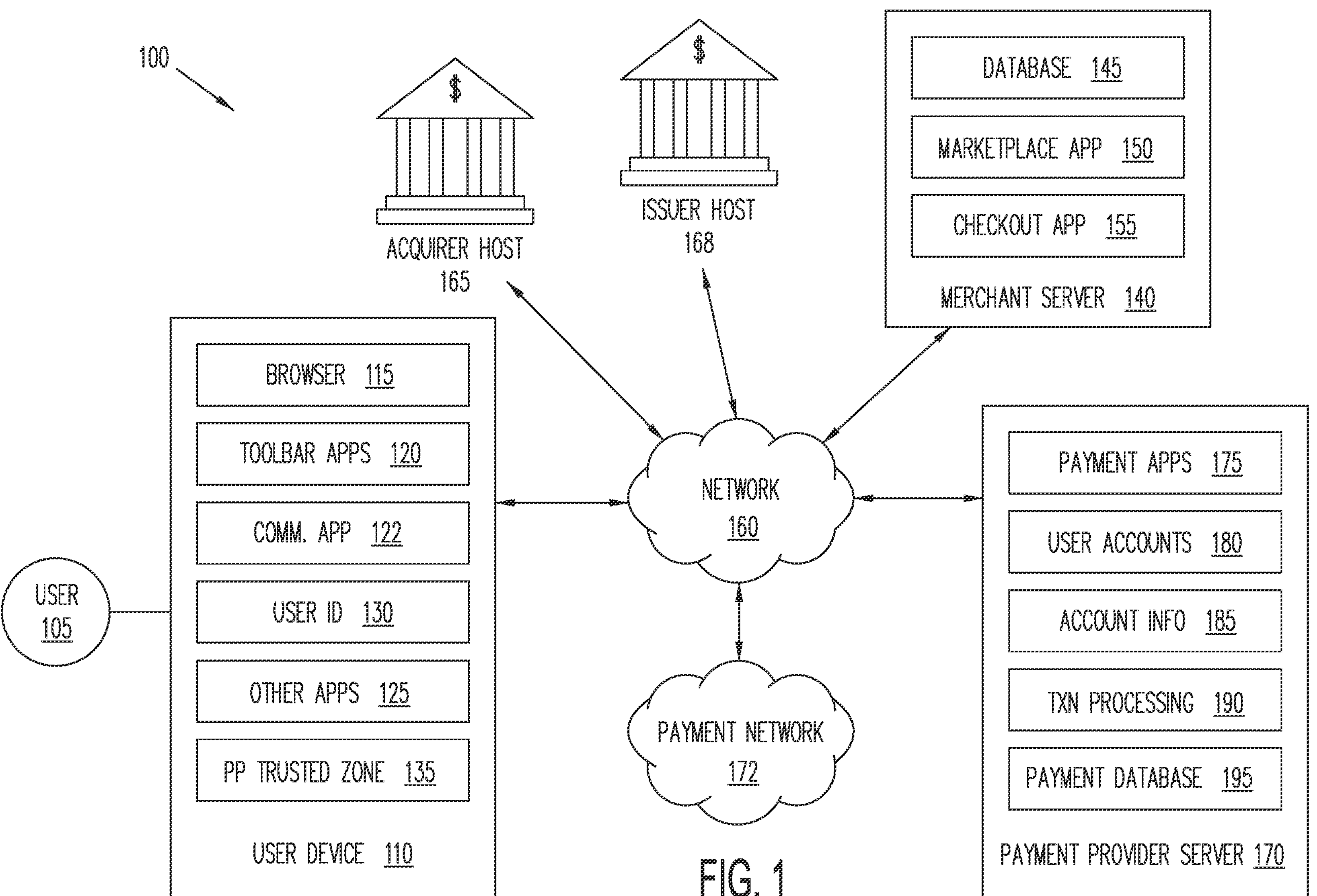
FIG. 1 is block diagram of a networked system suitable for implementing a cross-platform tokenization scheme according to various aspects of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

As payment technologies continue to evolve, particularly with the rise of mobile payments in recent years, data security has become more important than ever. As a result, an approach known as tokenization has been employed in order to protect consumers' sensitive financial and/or personal information. In more detail, when a consumer makes a payment, instead of submitting the consumer's sensitive financial information such as a real credit card number, an electronic "token" (hereinafter referred to as token for reasons of simplicity) is generated to serve as a proxy for the real credit card number. The token may be generated from random numbers but may appear and function as an equivalent to the real credit card number. If the token is compromised (e.g., intercepted by a hacker), it would not otherwise affect the consumer's real credit card number, since a different token may be generated the next time the consumer makes a payment. In this manner, tokenization can safeguard the consumer's sensitive information. Due to these benefits, various tokenization schemes or standards such as the EMV (Europay®, Mastercard®, and Visa®) tokenization standard have been steadily gaining adoption in the marketplace.

However, the generation of tokens still incurs a financial cost, however small that may be for each individual token. This situation is compounded when a consumer has accounts with a plurality of identity platforms (e.g., Facebook®, Google®, Microsoft®, etc.), where a financial transaction may be made through each identity platform. Conventionally, unique tokens would be generated for each identity platform, which means the entity that bears the cost for the token generation would have to pay for the token generation multiple times, even if the underlying consumer (for which the tokens are generated) is the same. This may become costly for the entity paying for the token generation, and it is wasteful. Therefore, the present disclosure proposes an optimized cross-platform tokenization scheme. According to the optimized cross-platform tokenization scheme, after verifying that multiple users from different identity platforms are really the same consumer, only one unique token that is platform-agnostic will be generated and used across multiple identity platforms. This will now be discussed in more detail below with reference to FIGS. 1-7.

FIG. 1 is block diagram of a networked system suitable for implementing the optimized tokens according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PayPal, Inc. of San Jose, CA. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc, wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. In conjunction with user identifiers 130, user device 110 may also include a secure zone 135 owned or provisioned by the payment service provider with agreement from device manufacturer. The secure zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

User device 110 may install and execute a payment application received from the payment service provider to facilitate payment processes. The payment application may allow a user to send payment transaction requests to the payment service provider. In particular, the payment application may authenticate user 105 before making payments. In an embodiment, the payment application may implement automatic authentication of the user 105 when the user 105 is at certain payment locations. The payment application in conjunction with the payment service provider may also provide proxies for user's credentials and funding instrument (e.g., payment and identity proxies for transaction) within secure zone 135 to be used with/without further authentication with payment service provider depending on the transaction or payment situation. The payment application may also receive relevant payment and identity proxies from proximity based ancillary systems such as a Bluetooth beacon installed in the merchant's premises in association with the payment service provider for the purpose of processing transactions or providing value added services to the user.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

In some embodiments, the merchant server 140 is a part of, or is maintained by, an identity platform. An identity platform is a platform on which a consumer can establish and maintain an identity. The consumer's identity may include, but is not limited to, the consumer's real name, shipping address, billing address, phone number(s), email address, account username, account password, account settings or preferences, funding instrument information (e.g., credit card number, debit card number, checking or savings account information), etc. At least some of the identity information of the user may be sensitive in nature and should be protected. In some embodiments, the identity platforms may include a social network, such as Facebook®, Google® (e.g., via Google Plus®), YouTube®, Twitter®, Pinterest®, etc. In other embodiments, the identity platforms may include a hardware/software company such as Apple®, Microsoft®, Sony®, etc. In yet other embodiments, the identity platforms may include traditional retailers such as Macy's®, Sear's®, Walmart®, etc. Thus, an identity platform may be part of or managed by a merchant or merchant server or separate from the merchant or merchant server.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Account information may also include user purchase history and user ratings. Advantageously, payment application 175 may be configured to interact with merchant server 140 on behalf of user 105 during a transaction with checkout application 155 to track and manage purchases made by users and which and when funding sources are used. In some embodiments, an identity platform may be managed by or be part of a payment provider service, such as payment provider server 170, or be a separate entity or service provider that manages identity.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

In one embodiment, payment provider server 170 may include a token vault storing various information on token formats, conventions, data, and the like. For example, a token may be generated for a user's payment account to allow payment transactions using the token. A user's identity information, preferences, or other information may be stored and associated with the user's account and mapped to tokens. Merchant accounts at the payment provider server 170 also may store merchant's information, such as type of merchant, product or service offered, method of payments, and the like to ensure diversified use of tokens that may vary by merchant type/service etc.

Payment network 172 may be operated by payment card service providers or card associations, such as DISCOVER, VISA, MASTERCARD, AMERICAN EXPRESS, RuPAY, China Union Pay, etc. The payment card service providers may provide services, standards, rules, and/or policies for issuing various payment cards. A network of communication devices, servers, and the like also may be established to relay payment related information among the different parties of a payment transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at various merchants who agreed to accept the payment card.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

As discussed above, traditional tokenization schemes may require unique tokens to be generated for transactions involving each identity platform. For example, a hypothetical user John Doe may have an account with each of the following identity platforms: Facebook®, Apple®, Google®, and Microsoft®. Under the conventional tokenization approach, a token 1 is generated for John Doe's transactions via Facebook®, a token 2 is generated for John Doe's transactions via Apple®, a token 3 is generated for John Doe's transactions via Google®, and a token 4 is generated for John Doe's transactions via Microsoft®.

These tokens are unique and different from each other, because as far as the token generation entity is concerned, the transactions that led to the token generation may come from different users, even though in reality they all came from the same person—John Doe. Generating multiple tokens for the same person is financially wasteful, since the generation of each token has a certain cost. Therefore, the entity paying for the token generation incurs unnecessary costs for the extra tokens generated.

According to the various aspects of the present disclosure, the payment provider server 170 may implement an identity engine to determine whether users from different identity platforms are really the same underlying person. Once multiple users from different identity platforms have been determined to be the same person, then a single unique platform-agnostic token is generated and sent to these different identity platforms to facilitate the various transactions on these different identity platforms. This token is referred to as a cross-platform token.

Figure 2:
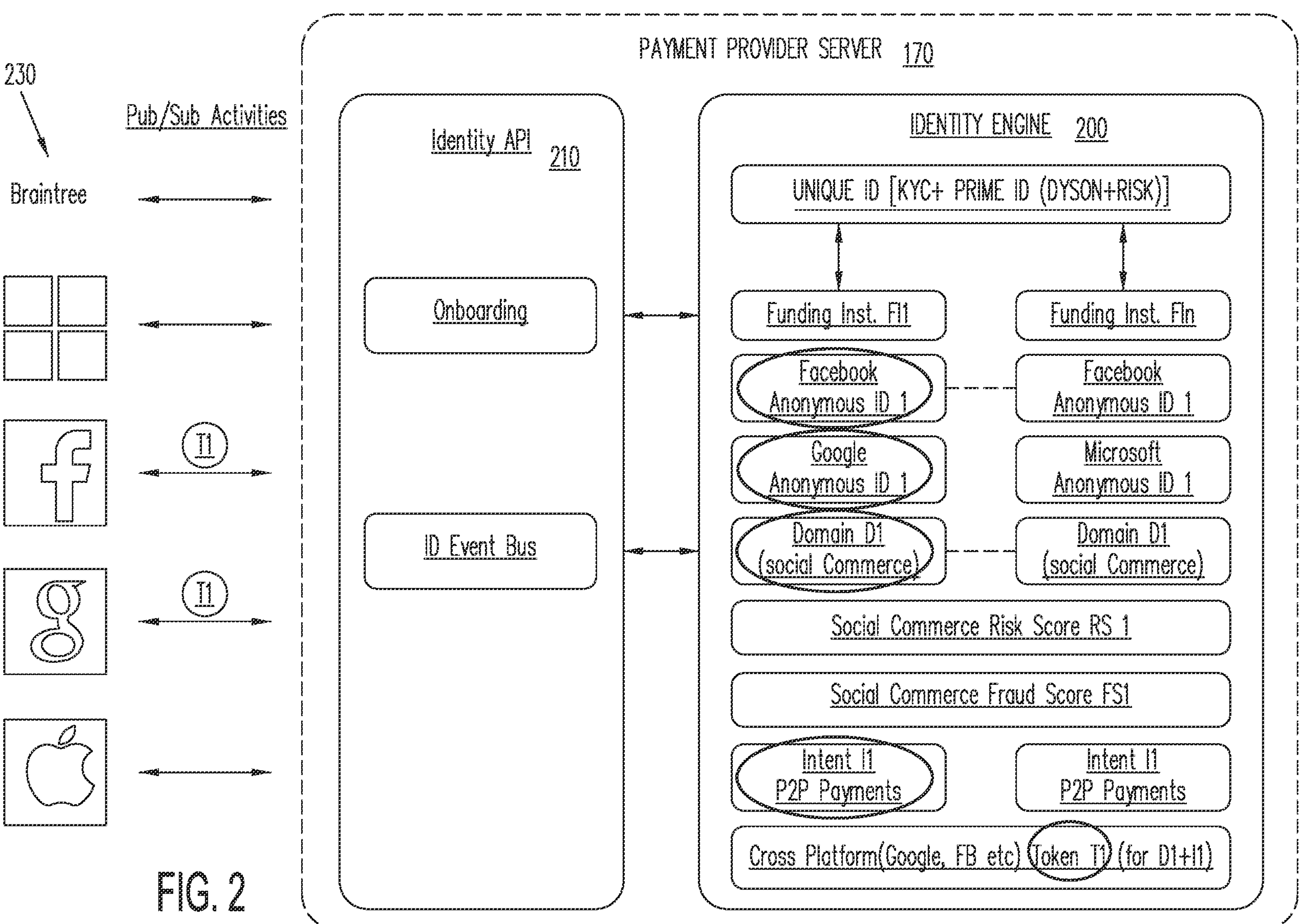
FIG. 2 is a diagram illustrating an identity engine for implementing the cross-platform tokenization according to various aspects of the present disclosure.

FIG. 2 illustrates a simplified block diagram of the cross-platform tokenization approach of the present disclosure. The payment provider server 170 includes an identity engine 200 and an identity API (Application Program Interface) module 210. A plurality of identity platforms 230 are in communication with the payment provider server 170 via the API module 210. The identity platforms 230 shown in FIG. 2 are merely examples and include Braintree®, Microsoft®, Facebook®, Google®, and Apple®. The identity platforms 230 may be communicating with the payment provider 170 to facilitate transactions such as financial purchases made by their respective users.

As a part of such communication, the identity platforms 230 may be sending the user's information as well as information regarding the transaction to the payment provider server 170. For example, such information may include publish/subscribe based industry standard services/activities. The publish services may include, but are not limited to: credit card information or other financial instruments, anonymous platform ID (e.g., username), domain of transaction, intent of transaction, fraudulent activities, account takeovers, ID changes, etc. The subscribe services may include, but are not limited to: getting tokens from platform IDs, getting token updates, getting relevant transaction updates, getting token blacklisting updates, getting issuer updates, etc.

The payment provider server 170 uses the identity engine 200 to analyze the information received from the identity platforms 230 to determine whether two or more of the users from different identity platforms 230 are actually the same person. In some embodiments, as a part of its analysis, the identity engine 200 may compare the information submitted from different identity platforms corresponding to different users to see what information, if any, is common in both identity platforms. For example, a user 1 from Microsoft® may have an anonymous username ABC123, a user 2 from Facebook® may have an anonymous username DEF456, a user 3 from Google® may also have an anonymous username DEF456, and a user 4 from Apple® may have an anonymous username GHI789. The comparison of the usernames indicates that the user 2 from Facebook® and the user 3 from Google® have the same username (DEF456), and as such they are likely the same actual person. Users 1 and 4 have different usernames from each other and from users 2 and 3, and as such they may be different persons.

As another example, funding instrument information may also be analyzed by the identity engine 200. The user 1 from Microsoft® may have a Mastercard® from Citi Bank® as its funding instrument, the user 2 from Facebook® may have a VISA® card from JP Morgan Chase® as its funding instrument, the user 3 from Google® may also have a VISA® card from JP Morgan Chase® as its funding instrument, and the user 4 from Apple® may have an iTunes® gift card as its funding instrument. The comparison of the different funding instruments from different users on different identity platforms indicates that, once again, the user 2 from Facebook® and the user 3 from Google® have the same funding instrument (VISA® card from JP Morgan Chase®), and as such they could be the same actual person. Users 1 and 4 have different funding instruments from each other and from users 2 and 3, and as such they may be different persons. It is understood that in some embodiments, the funding instrument information may contain more specificity, such as partial or full credit card numbers of checking/savings account numbers. In those embodiments, the comparison of the funding instrument information may include comparing the specific partial or full credit numbers of checking/savings account numbers from different users on different identity platforms.

As yet another example, the domain of a transaction may also be compared. As examples, domains may include, but are not limited to: social commerce, operating system, physical marketplaces, virtual marketplaces, transportation, entertainment, etc. In an example, the transaction corresponding to user 1 from Microsoft® may be operating system related (e.g., a renewal request for subscription of Windows 8), the transaction corresponding to user 2 from Facebook® may be for a social commerce transaction (e.g., a purchase relating to a Web App), the transaction corresponding to user 3 from Google® may also be a social commerce transaction (e.g., a purchase relating to a mobile App), and the transaction corresponding to user 4 from Apple® may be for an Apple® product (e.g., an iPhone®). The comparison of the different domains of the transactions corresponding to different users on different identity platforms indicates that the transactions corresponding to user 2 from Facebook® and the user 3 from Google® have the same domain (social commerce), and as such users 2 and 3 could be the same actual person. Transactions corresponding to users 1 and 4 have different domains from each other and from users 2 and 3, and as such users 1 and 4 may be different persons.

As a further example, the intent of a transaction may also be compared. As examples, the intents may include, but are not limited to: person-to-person (P2P) payment, in-app purchases, etc. It is understood that different users from different identity platforms may have similar domains but different intents, or vice versa. In an example, the intent of the transaction corresponding to user 1 from Microsoft® may to pay a third party company, the intent of the transaction corresponding to user 2 from Facebook® may be a person-to-person (P2P) payment, the intent of the transaction corresponding to user 3 from Google® may also be a P2P payment, and the intent of transaction corresponding to user 4 from Apple® may be to pay the identity platform directly. The comparison of the intent of payment of the transactions corresponding to different users on different identity platforms indicates that the transactions corresponding to user 2 from Facebook® and the user 3 from Google® have the same intent, and as such the users 2 and 3 may be the same actual person. Transactions corresponding to users 1 and 4 have different intents from each other and from users 2 and 3, and as such users 1 and 4 may be different persons.

These examples above are merely a subset of the types of information that can be analyzed to determine whether or not multiple users are really the same person. Other types of information that can be analyzed in this regard may include, but are not limited to, a residential address or shipping address of the user, an email address of the user, a phone number of the user, an employer of the user, an occupation of the user, a birthdate of the user, a birth place of the user, the citizenship of the user, an age of the user, a credit score of the user, a credit history of the user, a school attended by the user, relatives of the user, a hobby of the user, an IP (Internet Protocol) address of a user device (that is giving rise to the transaction from the particular identity platform), a MAC (Media Access Control) address of the user device, a UUID (Universally Unique Identifier) of the user device, an Internet browser type, a UDID (Unique Device Identifier), a screen resolution of the user device, or even biometric information such as fingerprints, heart rate, blood pressure, etc. Of course, not all identity platforms will contain all of these types of information listed above, but the identity engine 200 may analyze whatever types of information that are common in multiple identity platforms.

In some embodiments, an overall match score is calculated after all the possible or desired comparisons are performed for the available types of information. For each comparison, a sub-score may be generated, and all the sub-scores may be added up to obtain the overall match score. For example, if the comparisons only include the four examples discussed above—username, funding instrument, domain of transaction, and intent of transaction—then the comparison of each type of information may make up a sub-score. The sub-scores are not necessarily assigned to have equal weight. For example, the sub-score corresponding to the matching of the usernames may have a heavier weight (e.g., 50) than the sub-score corresponding to the domain of transaction (e.g., 15). The sub-scores are added up to calculate the overall match score (e.g., 100), where a higher overall match score indicates a higher likelihood that the users are the same person.

It is understood that the calculation of each sub-score may not be binary. In other words, it is not necessarily an "all-or-nothing" calculation. In some embodiments, a portion of the sub-score may be given if there is a partial match between the information from different users. The closer the match, the higher the sub-score. For example, suppose that the maximum sub-score for matching the usernames is 50, which requires an identical match. A partial match between the usernames may yield a sub-score less than 50. To illustrate, suppose user 1 has a username that is "Basketball_Lover_23", user 2 also has a username that is "Basketball_Lover_23", user 3 has a username that is "BasketballLover23", and user 4 has a username that is "KingSlayer." In this example, user 1 and user 2 have identical usernames, and thus the sub-score for a username match between user 1 and user 2 may be a perfect 50 out of 50. The username for user 3 is similar to that of user 1 or user 2, and thus the username matching score between user 3 and user 1 or user 2 is less than 50 but is greater than 0, for example 25. The username for user 4 is completely different than that of user 1, user 2, or user 3. As such, the username matching between user 4 and any of the other users is 0. In some embodiments, correlation or autocorrelation algorithms may be executed by the identity engine to determine how well the usernames match one another.

In some embodiments, the identity engine 200 may specify a threshold score that must be exceeded for the different users from different identity platforms to be considered the same actual person. For example, suppose that the threshold has been set to be 60, and also suppose that the overall match score between user 1 (from Microsoft®) and user 2 (from Facebook®) may be 0, the overall match score between user 2 (from Facebook®) and user 3 (from Google®) may be 100, and the overall match score between user 3 (from Google®) and user 4 (from Apple®) may be 10. In that case, the identity engine 200 may determine that user 2 and user 3 are really the same actual person, while user 1 and user 4 are separate persons, and neither user 1 nor user 4 is the same person as the person corresponding to user 2 or user 3. This is because the overall matching score between user 2 and user 3 exceeds the threshold score (100>60), while the overall matching score between user 1 and 2 or between user 3 and user 4 does not meet the threshold (0<60, and 10<60).

In some embodiments, all the user-related information extracted from a given identity platform may be compiled into a user profile, also referred to as a unique ID. The unique IDs corresponding to different users from different identity platforms may be analyzed and/or compared by the identity engine 200 to determine if two or more users are really the same actual person. Of course, this analysis or comparison of the different unique IDs may or may not include the process(es) of generating/calculating the various scores as discussed above.

In some embodiments, the identity engine may also assess a risk score or a fraud score of the transaction. For example, if different users from different identity platforms each have a good credit score or good credit history, or if the value of the transaction is low, the risk score may be low. In that case, the identity engine 200 may require less strict matching of the information from different users to "determine" that the different users are the same person. Conversely, if one or more of the users have a low credit score or poor credit history, or if the value of the transaction is high, the risk score may be high. In that case, the identity engine 200 may enforce stricter matching requirements before "determining" that the different users are the same person. The fraud score may share certain similarities with the risk score but may be different in other aspects. For example, the fraud score may pertain to whether one or more of the users' account(s) have had an account takeover or have suffered identity theft, or whether the proposed transaction is in an area of commerce whether fraud is prevalent. It is understood that the risk score or fraud score may be set at the "domain" level discussed above, or at the "intent" level discussed above.

Figure 3:
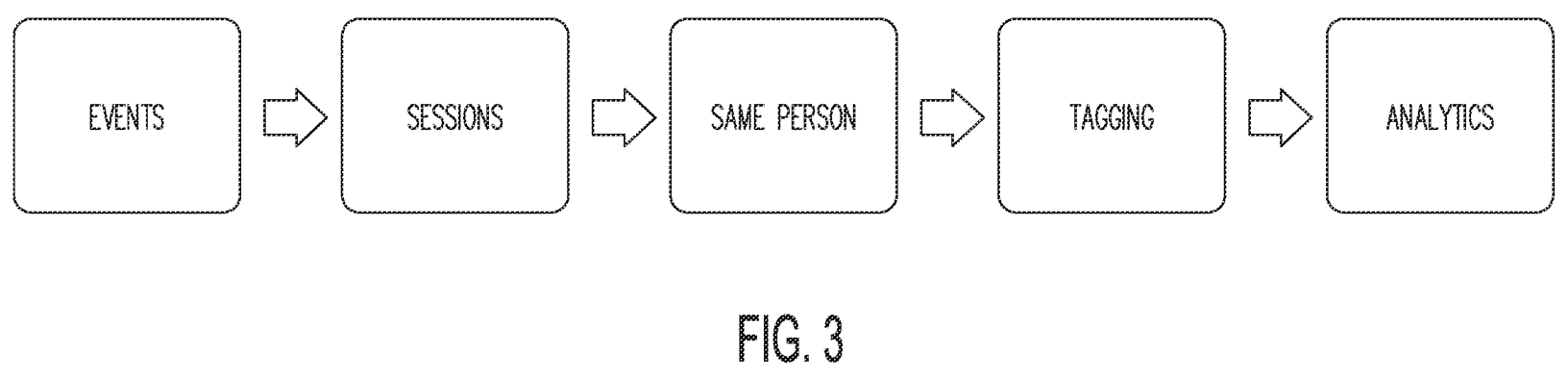

Referring to FIG. 3, a multi-step approach may be used to determine whether different users from different identity platforms are the same person according to an embodiment of the present disclosure. At an "events" step, all events of each identity platform (e.g., Facebook® or Microsoft®) are aggregated into "sessions". At a subsequent "sessions" step, several analytic methods are used to connect between the related sessions and aggregate them into the "same person." In the "same person" step, the "same person" chain is comprised of all the sessions and events that were related to the same user. As many sessions as possible are connected into the lowest number of persons. At the "tagging" step, a holistic tagging decision is made for each "same person" chain, in order to decide whether it is the user or not. The tagging is then propagated both upwards (e.g., account level) and downwards (e.g., sessions, assets). At the "analytics" step, after a full data source of tagged sessions, events, and "same person" chains is created, the data can be analyzed and used for decision making and research before issuing tokens. The analytics may include factors such as:

did the account ever suffer an account takeover (ATO)

is it in good standing does it have trusted email, address, phone, or other user related information fraud score credit card number or bank identification number geolocation The analytics will help the identity engine 200 determine whether users from different identity platforms are actually the same underlying person.

Referring now back to FIG. 2, regardless of the particular methodologies used to determine that multiple users from different identity platforms are the same actual person, once that determination is made, the payment provider server 170 generates a cross-platform token that is used to facilitate the transactions for the user from each of the multiple identity platforms. For example, if user 2 from Facebook® and user 3 from Google® have been determined to be the same actual person, then a cross-platform token (e.g., T1) may be generated for both of the users, even though they are from different identity platforms.

Using the same token for user 2 and user 3 does not increase risk of the transactions, because the users 2 and 3 are the same person. In other words, there is no risk of divulging sensitive information to another person. Meanwhile, using a single token for both user 2 and user 3 (and their respective transactions on different identity platforms) reduces cost, since only one token needs to be generated instead of two. In actual practice, more than two users may be determined to be the same person, especially as social networking sites and online marketplaces continue to proliferate, which leads to the same person having more and more accounts. The more users from different identity platforms can be consolidated to the same actual person, the more financial cost can be reduced by having a single cross-platform token for the users from all of these identity platforms. In this manner, the present disclosure optimizes the conventional tokenization scheme.

Still referring to FIG. 2, the payment provider server 170 also communicates with the identity platforms 230 to safeguard against fraud. In more detail, the identity platforms 230 will publish activities or services to the payment provider server 170 via the identity API module 210. If fraud has been detected by a particular identity platform 230 (e.g., account takeovers, data breach, or other hacking related activities), where a user's sensitive information could have been compromised, the identity platform 230 will include these activities in its publication to the payment provider server 170. When the payment provider server 170 is notified via the identity API 210, the identity engine 200 will automatically change or replace all the previously issued tokens to that identity platform without the end user (e.g., the user on the identity platform that has been breached) having to manually change his or her account information. In other words, the end user need not change all of his/her funding instrument information, because the new tokens from the payment provider server 170 will take care of that. Since the tokens are cross-platform, the payment provider server 170 will send the tokens to other identity platforms where the user also has an account. In addition, the identity engine 200 will also blacklist the old tokens, so that if the old tokens are ever attempted to be used, the transactions will be denied.

Figure 4A:
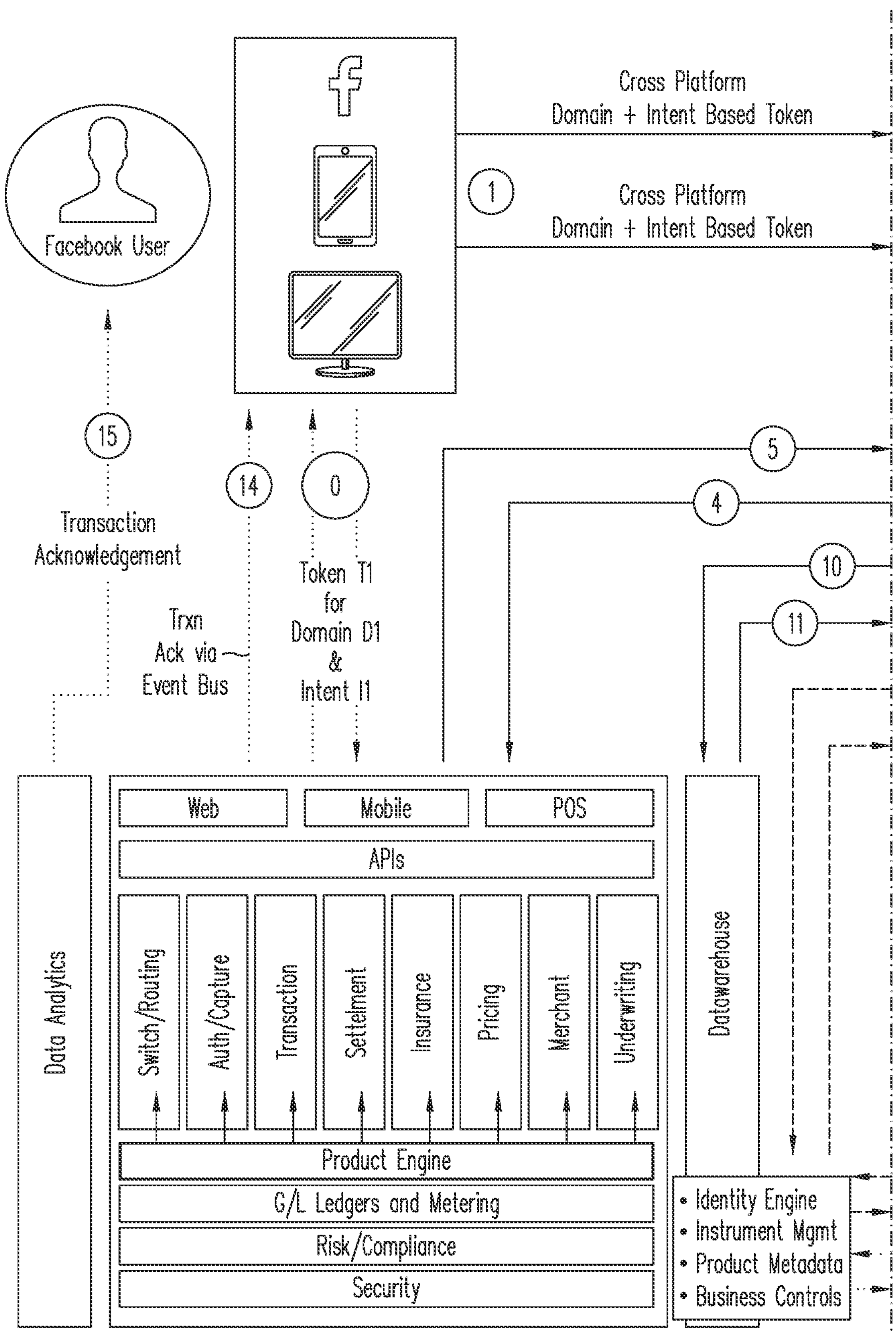
FIGS. 4A and 4B are a diagram that visually illustrates the various processes for implementing the cross-platform tokenization according to various aspects of the present disclosure.
Figure 4B:
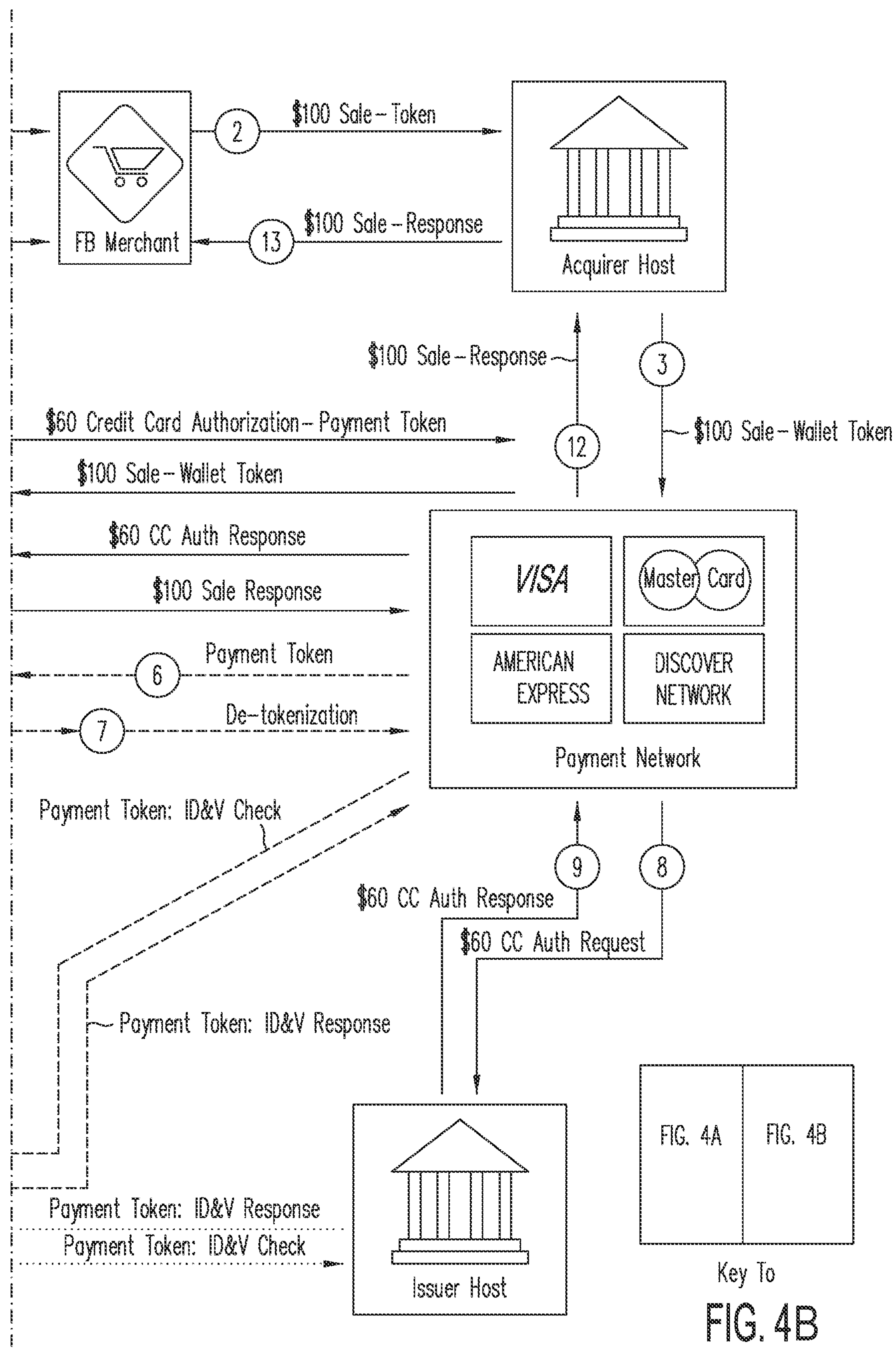

FIGS. 4A and 4B are a flowchart showing various processes for implementing the optimized cross-platform tokenization scheme according to one embodiment of the present disclosure. Initially, backend processes may be performed at the payment service provider 170, e.g., PayPal, Inc. In some embodiments, the payment service provider 170 may include the token service provider. In particular, an assurance process is performed to request assurance, such as confirmation of user data and credentials, for funding instrument and users from the issuer, the payment network, or both. The token service provider may receive assurance from the issuer, the payment network, or both. In response to receiving assurance, the token service provider may generate and assign payment tokens to funding sources. In some embodiments, a funding source may be assigned with multiple payment tokens.

At step 0, a cross-platform token T1 is generated. The cross-platform token T1 is generated for a domain D1 and for an intent I1. The token T1 may be generated from random numbers and exist in software, or it may be hard-coded in a payment card in some embodiments, for example a payment card configured to implement payment via MSR, EMV, or NFC. The token T1 may be generated for a mobile device or a desktop/laptop device.

The term "token" may refer to a proxy for a user's payment account, such as a payment provider user account, e.g., a 8 to 19-digit numeric value which passes basic validation rules of an account number along with discretionary data in industry standard track 1 and track 2 formats that may have information pertaining to additional value added services such as identity assurance, loyalty, Internet of Things (IoT), etc. Tokens may be generated within a BIN/IIN range that has been designated as a token BIN/IIN range and flagged accordingly in all appropriate BIN/IIN tables.

In some embodiments, a token may be hard coded onto a physical payment card, such as a payment provider branded card. The token may be used in any format offline e.g. magnetic stripe reader, EMV or NFC. The validity of the tokens may be set in real time or at an account level via a backend policy applied on the BIN/IIN.

At step 1, a user (e.g., a Facebook® user) may pass the cross-platform token—which is also domain-based and intent-based—to a merchant (e.g., a Facebook® merchant) or other entity to process a transaction. For example, the user may pass the token to the merchant for a $100 sale via various types of transaction instruments, such as a payment card, a mobile device, a desktop device, a wearable device, and the like, via various channels, such as NFC, BLE, PayCode, check in, MSR, EMV, and the like.

At step 2, the merchant may then pass the cross-platform token received at the point of sale (POS) to the acquirer host along with transaction information, such as the product or service purchased, the amount of purchase ($100), location, time, date of purchase, and any other information related to the purchase.

At step 3, the acquirer host then may process the information and pass the cross-platform token along with the transaction information to the appropriate payment network. As examples, the payment network may include entities such as VISA, Mastercard®, American Express®, or Discover®.

At step 4, the payment network may further process the cross-platform token. The payment network may determine that the cross-platform token was generated from the payment service provider, e.g., PayPal. The payment network then sends the cross-platform token back to the payment service provider for a $100 authorization.

At step 5, based on the funding instruments designated at the user's payment account, e.g., PayPal account, and the payment account balance of the user at the payment service provider, the payment service provider may send the appropriate authorization that needs to be sent to the issuer of the funding instrument along with payment token for the funding instrument. For example, the user may have $40 balance in the payment account at the payment service provider to be used for the $100 purchase. $60 is still needed to complete the purchase. As such, the payment service provider may send the authorization that needs to be sent to the issuer, e.g., authorization for $60.

At step 6, the payment network may receive the payment token from the payment service provider and may realize that this is a payment token from the payment service provider, e.g., PayPal, and may send the payment token back to payment service provider's token service provider for de-tokenization.

At step 7, the payment service provider may process a payment token via a suitable data transmission protocol or connection based on the relevant payment network making the connection. The payment service provider may then send the appropriate de-tokenized information relevant to the non-payment provider funding instrument (in this case $60 for credit card on file).

At step 8, the payment networks may receive the de-tokenized information for the non-payment provider funding instrument on file and may send it to the issuer host via an authentication transaction.

At step 9, the issuer host may review the PAN information and sends an authorization (for the $60 credit card transaction) success call or message to the payment network.

At step 10, the payment network may send the $60 authorization success back to the payment service provider, e.g., PayPal, via the established connection.

At step 11, the payment service provider may process this information and may respond with a $100 authorization success call or message to the payment network.

At step 12, the payment network may send this $100 authorization success message back to the acquirer host.

At step 13, the acquirer host may send the $100 authorization success message back to the merchant's POS allowing the retail associate to complete the transaction in the case of offline transaction or provide a success message to the user in the case of online transaction.

At step 14, the payment service provider, e.g., PayPal, may send a notification (email/in-app) to the user that transaction has successfully been completed. In other words, the transaction is acknowledged, which may be done via an event bus.

It is understood that a cross-platform token provider, such as PayPal, Inc., may implement various aspects of cross-platform token generation. In an embodiment, the token provider may generate or create tokens based on the transaction channel such as online or mobile or in-store or actions performed by the user. For example, the transactions may be financial transactions, such as payments for a purchase, fund transfers, and the like. The transactions may be non-financial transactions, such as checking into a hotel, sharing value added information, such as medical information (allergy), preferences (room preference for hotels), signing up for a membership account, and the like. The tokens may include identity information of the user that is relevant to the type of transaction being implemented by the user. For example, user's preferences, user's healthcare records, user's age, user's address, user's affiliations, user's loyalty programs, social networking account, and the like may be included with the token to help facilitate the transactions. In an example, if the transaction is related to user's healthcare, such as checking in at a doctor's office, the token may include the user's insurance card/ID information that can be used to pre-calculate co-pays and also signal required pre-checks and other actions to the user while notifying medical authorities about a patient's payment and health history to provide relevant services. In another example, if the transaction is related to a user's payment, a user's payment preference, such as preferred funding source, a preferred percentage for tips, and the like, the cross-platform token may include these user preferences to customize the transaction. The tokens may not have monetary value, but may represent an underlying mapping to a metadata source that may be mapped by a cross-platform token vault.

The cross-platform token provider, such as PayPal, may implement various processes. In an embodiment, the cross-platform token provider may authenticate the user based on the token. The cross-platform token provider also may generate tokens based on the requirements of the transactions. In another embodiment, the cross-platform token provider may implement token management, such as register user, add, delete, or manage metadata related to a user's identity or information. Proprietary algorithms may be used for token assurance and/or risk management. The cross-platform token provider also may mange entities, such as merchants, that need access to the token or token metadata. The cross-platform token provider may define and implement frameworks for secure operation of the token. In still another embodiment, the cross-platform token provider may provide token service to users. In particular, the identity token provider may provide service for obtaining new tokens, validation, and metadata access for users or to enable seamless experiences for Internet of Things (IoT). User may be consumers, merchants, businesses, government entities, or any other entities or organizations that require or would benefit from user's information to complete various payment and non-payment service transactions. A secure mechanism may be provided for retrieving tokens, storing tokens in mobile apps and deciphering the stateless tokens in the backend to complete appropriate transactions and services. For example, symmetric encryption techniques may be used to store and/or communicate the tokens over existing secure channels such as SSL to add multiple layers of security.

In an embodiment, the system may use industry standard BINs or IINs and provide tokens as aliases to funding sources, customer identities and customer metadata together. These tokens may replace the use of actual funding source information and customer information, such as credit card and other user information that are sent online to a merchant for transaction processing. This may prevent any information from being compromised during transmission across payment networks and/or channels.

The cross-platform token service provider may provide tokenization services to payment networks, third party vendors, service providers, issuers, merchants, providers of a service and consumers. In an embodiment, the cross-platform token service provider may provide services for at least four different types of tokens. A static cross-platform token may be used during the creation of a payment card compatible for use with magnetic strip reader, near-field communication (NFC), or EMV chip. The static cross-platform token may be hardcoded with the payment card. A mobile cross-platform token may be used by mobile devices (wearable/non-wearable/smart) that are configured to run payment related applications for use in transactions via Near Field Communication (NFC), Bluetooth/Bluetooth Low Energy (BLE), Wifi, wi-di, QR Code and other mobile payment communication mediums. An encrypted cross-platform token may be cached for usage via mobile payment solutions when network connectivity is limited or not available. An online cross-platform token may be used for online payment transactions via web or mobile web on desktop browsers, mobile web browsers, tablet browsers, wearable device browsers and other web applications. The use of these tokens may replace the use of actual payment information, identity of the consumer or funding source information for secure transmission. This may reduce the risk of these private information from being compromised both online and offline. All of these tokens will also mask user identity and contain metadata that can be used for multitude of value added services. By using these tokens, the system may provide increased security, improved interoperability among different payment networks, enabling new and upcoming payment channels, and convenience for consumers.

By establishing the cross-platform token service, a payment service provider, such as PayPal, Inc., may serve as the manager of not only the users' payment transactions, but also other identity information of the users. As such, the users need not request tokens via a third party to obtain a token during transactions. Users of the payment service provider, such as PayPal users, who already process payments through the payment service provider, may now have all their payment information routed across channels via tokens as an alias to their payment information and identity. When this information is routed back to the cross-platform token service provider, the service provider may further enhance security by sharing the underlying funding instrument information with the payment networks via an industry standard unique third party token called the payment token without disclosing funding information. When the payment network learns of the underlying funding information via de-tokenization service from the industry standard third party token service provider, the payment network may share the same payment token without disclosing or opening the fund information to the issuer during transmission and processing. The cross-platform token service provider can further mask the user information but provided value added information for value added services, such as loyalty, health care, etc. without compromising the user identity while still providing relevant data. The above features may ensure a closed loop transmission of information to enhance security and integrity.

Additional details pertaining to the generation of tokens and their life cycle management are provided in the Appendix of the present disclosure.

Figure 5:
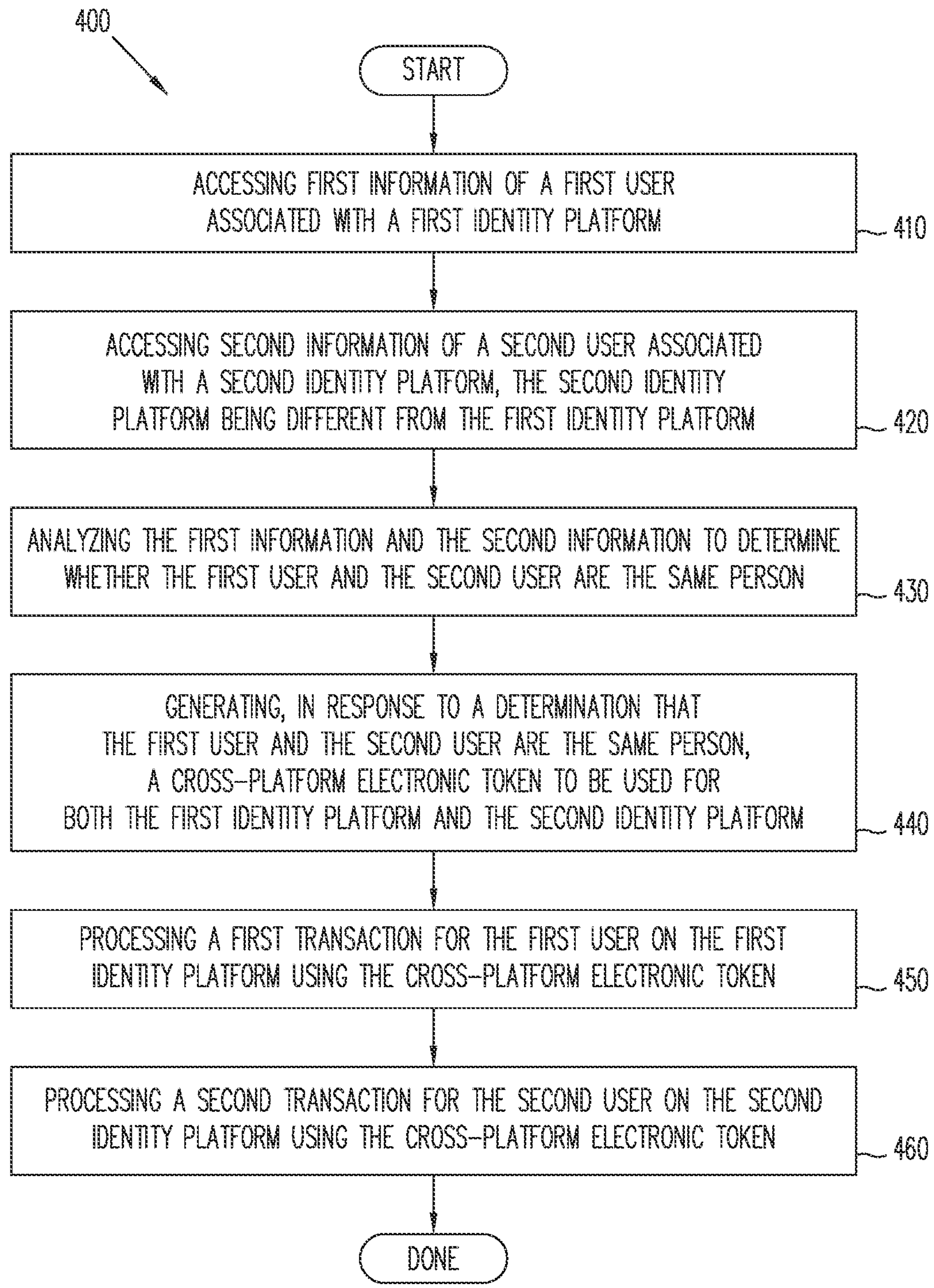
FIG. 5 is a flowchart of a method of generating cross-platform tokens according to various aspects of the present disclosure.

FIG. 5 is a flowchart illustrating a method 400 of generating a cross-platform token according to various aspects of the present disclosure. The method 400 includes a step 410 of accessing first information of a first user associated with a first identity platform.

The method 400 includes a step 420 of accessing second information of a second user associated with a second identity platform, the second identity platform being different from the first identity platform.

The method 400 includes a step 430 of analyzing the first information and the second information to determine whether the first user and the second user are the same person. In some embodiments, the analyzing comprises comparing the first information with the second information to identify areas of commonality.

The method 400 includes a step 440 of generating, in response to a determination that the first user and the second user are the same person, a cross-platform electronic token to be used for both the first identity platform and the second identity platform.

The method 400 includes a step 450 of processing a first transaction for the first user on the first identity platform using the cross-platform electronic token.

The method 400 includes a step 460 of processing a second transaction for the second user on the second identity platform using the same cross-platform electronic token.

In some embodiments, the first information or the second information comprises one or more of the following: username, funding instrument, domain of transaction, intent of transaction, residential address, shipping address, email address, phone number, employer, occupation, birthdate, birth place, citizenship, age, credit score, credit history, school attended, relatives, hobbies.

In some embodiments, the first information or the second information comprises biometric information of the first user or the second user, respectively.

In some embodiments, the accessing steps 410 or 420 comprises receiving the first information and the second information from an electronic device of the first user or the second user, respectively. In some embodiments, the first information or the second information comprises one or more of the following: an IP (Internet Protocol) address of the electronic device, a MAC (Media Access Control) address of the electronic device, a UUID (Universally Unique Identifier) of the electronic device, a UDID (Unique Device Identifier) of the electronic device, a screen resolution of the electronic device, or an Internet browser type used to communicate the first or second information.

In some embodiments, at least one of the first identity platform and the second identity platform comprises a social network or an online marketplace.

It is understood that at least some of the steps 410-460 are performed at least in part by one or more electronic processors of a system that is located remotely from the mobile electronic device. It is also understood that additional method steps may be performed before, during, or after the steps 410-460 discussed above. It is also understood that one or more of the steps of the method 400 described herein may be omitted, combined, or performed in a different sequence as desired.

The optimized cross-platform tokenization scheme of the present disclosure offers various advantages over conventional tokenization schemes. It is understood, however, that not all advantages are necessarily disclosed herein, different embodiments may offer different advantages, and that no particular advantage is required for all embodiments.

One advantage is effective economics. Since the tokens work for multiple identity platforms, cost of token generation is reduced. In addition, for identity platforms that offer reward points (or loyalty points) for its users, for example a department store that has either a physical marketplace or a virtual marketplace, the cross-platform (or platform-agnostic) token herein does not prevent the user from earning the reward points. Another advantage is that it is compatible with the existing ecosystem/infrastructure. The cross-platform tokenization disclosed herein is interoperable with existing payment providers, payment networks, and identity platforms and offers familiarity to their users and operators. The interoperability with existing infrastructure also means that the cross-platform tokenization disclosed herein can be easily implemented and quickly adopted.

Figure 6:
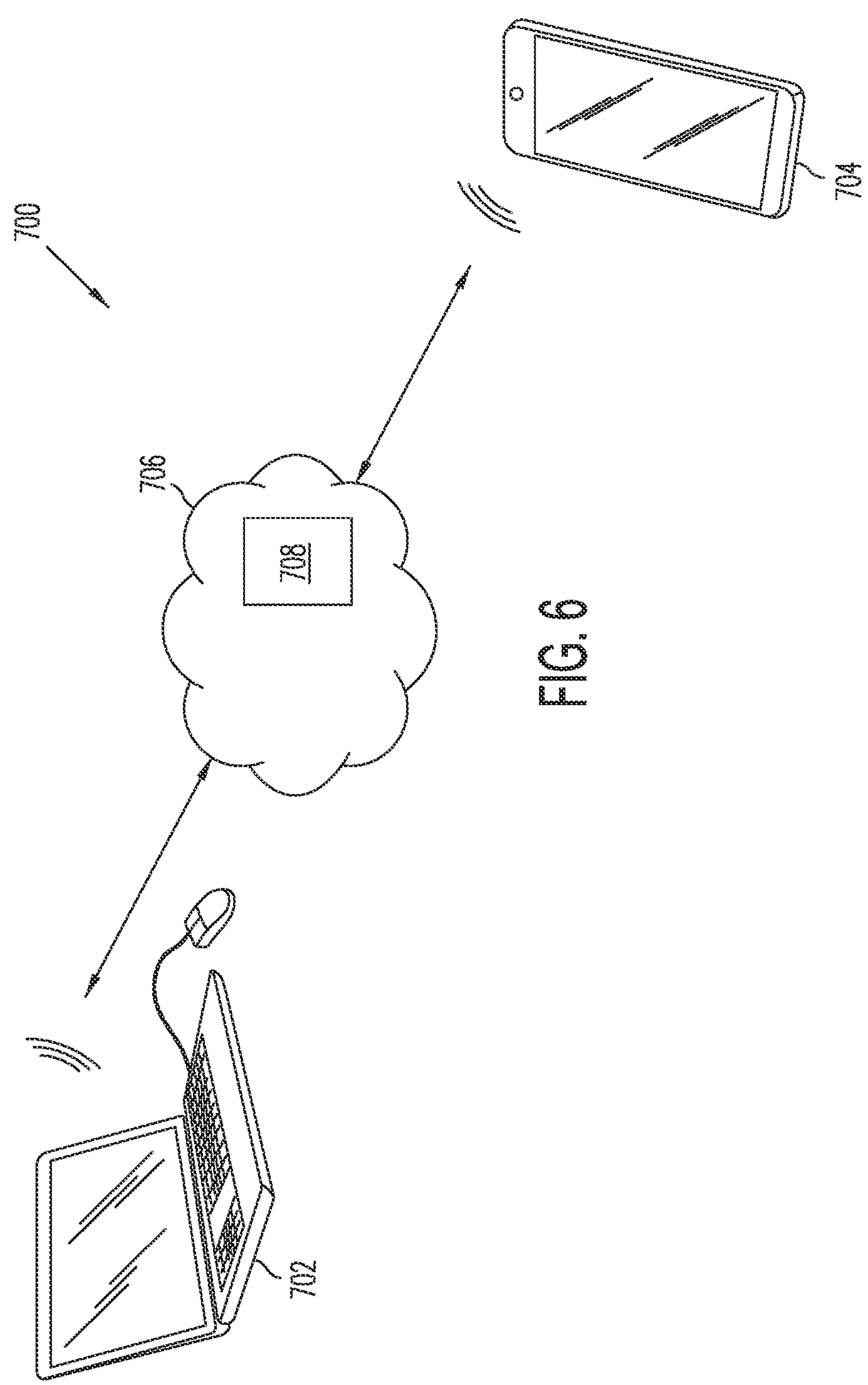
FIG. 6 is a diagram illustrating an example cloud computing architecture according to various aspects of the present disclosure.

FIG. 6 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet). In one example, a consumer has the mobile device 704, which is configured to access identity platforms and initiate purchasing transactions therethrough.

The mobile device 704 is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing and caching may be performed by the cloud-based resources 708. However, other divisions of responsibility are also possible in various embodiments.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702.

It is understood that the various components of cloud-based computing architecture 700 are shown as examples only. For instance, a given user may access the cloud-based resources 708 by a number of devices, not all of the devices being mobile devices. Similarly, a merchant or another user may access resources 708 from any number of suitable mobile or non-mobile devices. Furthermore, the cloud-based resources 708 may accommodate many merchants and users in various embodiments.

Figure 7:
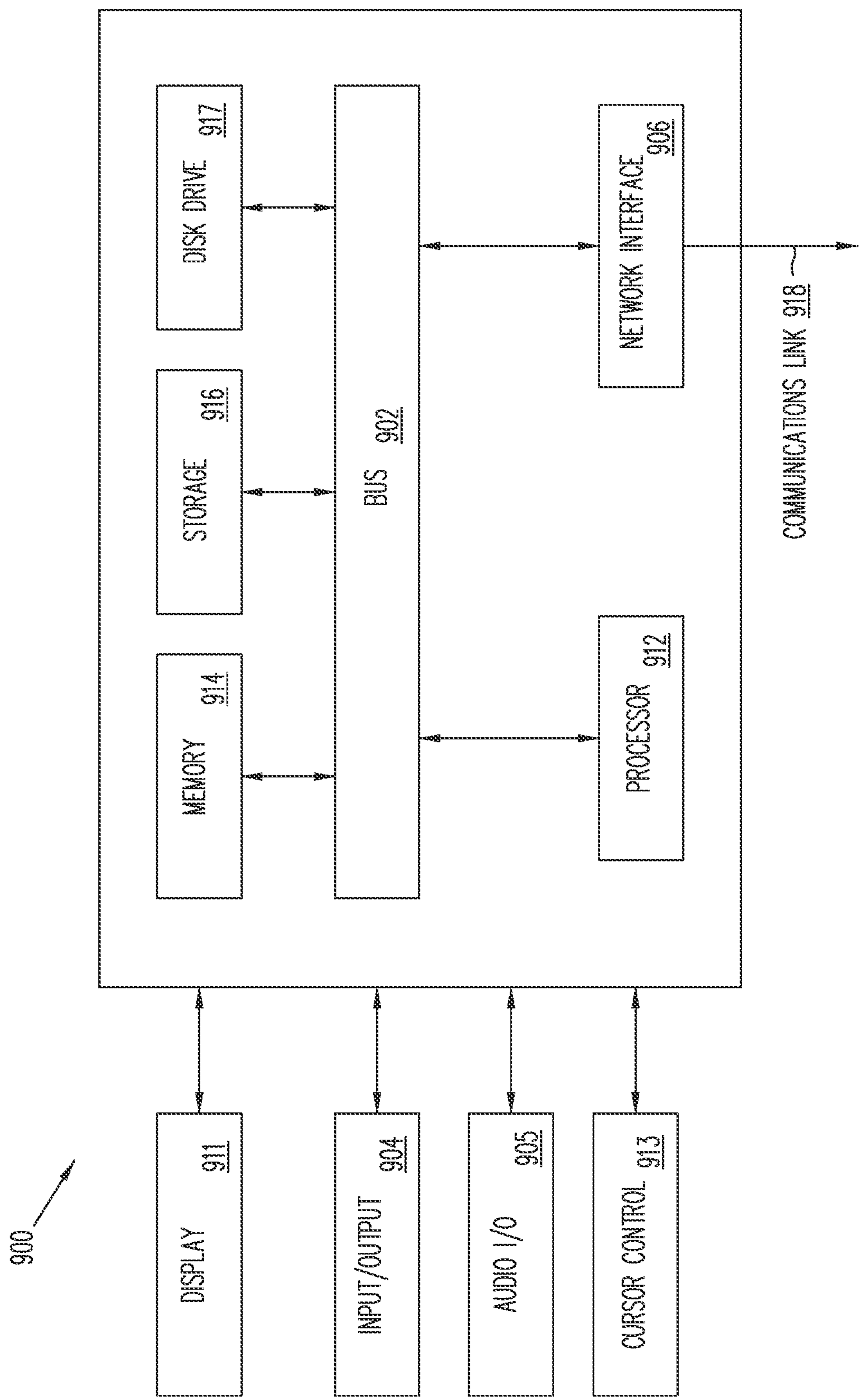
FIG. 7 is a block diagram of a computer system suitable for implementing one or more components in FIG. 1 according to various aspects of the present disclosure.

FIG. 7 is a block diagram of a computer system 900 suitable for implementing one or more embodiments of the present disclosure. In various implementations, the user device may comprise a personal computing device (e.g., smart phone, a computing tablet, a personal computer, laptop, wearable device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 900 in a manner as follows.

Computer system 900 includes a bus 902 or other communication mechanism for communicating information data, signals, and information between various components of computer system 900. Components include an input/output (I/O) component 904 that processes a user action, such as selecting keys from a keypad/keyboard, selecting one or more buttons or links, etc., and sends a corresponding signal to bus 902. I/O component 904 may also include an output component, such as a display 911 and a cursor control 913 (such as a keyboard, keypad, mouse, etc.). An optional audio input/output component 905 may also be included to allow a user to use voice for inputting information by converting audio signals. Audio I/O component 905 may allow the user to hear audio. A transceiver or network interface 906 transmits and receives signals between computer system 900 and other devices, such as another user device, a merchant server, or a payment provider server via network 360. In one embodiment, the transmission is wireless, although other transmission mediums and methods may also be suitable. A processor 912, which can be a micro-controller, digital signal processor (DSP), or other processing component, processes these various signals, such as for display on computer system 900 or transmission to other devices via a communication link 918. Processor 912 may also control transmission of information, such as cookies or IP addresses, to other devices.

Components of computer system 900 also include a system memory component 914 (e.g., RAM), a static storage component 916 (e.g., ROM), and/or a disk drive 917. Computer system 900 performs specific operations by processor 912 and other components by executing one or more sequences of instructions contained in system memory component 914. Logic may be encoded in a computer readable medium, which may refer to any medium that participates in providing instructions to processor 912 for execution. Such a medium may take many forms, including but not limited to, non-volatile media, volatile media, and transmission media. In various implementations, non-volatile media includes optical or magnetic disks, volatile media includes dynamic memory, such as system memory component 914, and transmission media includes coaxial cables, copper wire, and fiber optics, including wires that comprise bus 902. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 900. In various other embodiments of the present disclosure, a plurality of computer systems 900 coupled by communication link 918 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

One aspect of the present disclosure involves a system. The system includes an electronic memory storing programming instructions; and one or more electronic processors in communication with the electronic memory. The one or more electronic processors are configured to execute the programming instructions to perform the following steps: accessing first information of a first user associated with a first identity platform; accessing second information of a second user associated with a second identity platform, the second identity platform being different from the first identity platform; analyzing the first information and the second information to determine whether the first user and the second user are the same person; and generating, in response to a determination that the first user and the second user are the same person, a cross-platform electronic token to be used for both the first identity platform and the second identity platform.

Another aspect of the present disclosure involves a tokenization method. The method includes: accessing first information of a first user associated with a first identity platform; accessing second information of a second user associated with a second identity platform, the second identity platform being different from the first identity platform; analyzing the first information and the second information to determine whether the first user and the second user are the same person; and generating, in response to a determination that the first user and the second user are the same person, a cross-platform electronic token to be used for both the first identity platform and the second identity platform.

Yet another aspect of the present disclosure involves a non-transitory computer-readable medium comprising instructions which, in response to execution by a computer system, cause the computer system to perform a method comprising the following steps: accessing first information of a first user associated with a first identity platform; accessing second information of a second user associated with a second identity platform, the second identity platform being different from the first identity platform; analyzing the first information and the second information to determine whether the first user and the second user are the same person; and generating, in response to a determination that the first user and the second user are the same person, a cross-platform electronic token to be used for both the first identity platform and the second identity platform.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for managing identity tokens, the method comprising:

receiving, at a payment provider server, a first transaction request from a first identity platform for a first transaction initiated by a first user, the first identity platform managing first identity user accounts including a first identity user account for the first user, the payment provider server managing a plurality of user accounts that are separate from the first identity user accounts, the payment provider server managing first information associated with the first user submitted by the first identity platform, the first transaction request including a first token previously issued to the first identity platform;

receiving, at the payment provider server, a second transaction request from a second identity platform for a second transaction initiated by a second anonymous user, the second identity platform managing second identity user accounts including a second identity user account for the second anonymous user, the plurality of user accounts managed by the payment provider server being separate from the second identity user accounts, the payment provider server managing second information associated with the second anonymous user submitted by the second identity platform;

comparing, by the payment provider server, one or more areas of commonality between the first information and the second information;

generating, by the payment provider server, one or more sub-scores for the compared one or more areas of commonality, wherein each of the one or more sub-scores is generated for a respective one of the compared one or more areas of commonality;

calculating, by the payment provider server, an overall match score based on a total number of the generated one or more sub-scores;

determining, by the payment provider server and based on the calculated overall match score, that the first user and the second anonymous user are a same user;

responsive to determining that the first user and the second anonymous user are the same, generating, by the payment provider server, a cross-platform electronic token for use by the first identity platform and the second identity platform;

sending, by the payment provider server, the cross-platform electronic token to the first identity platform to use with the first transaction and subsequent transactions of the same user conducted with the first identity platform, the cross-platform electronic token deactivating the first token;

sending, by the payment provider server, the cross-platform electronic token to the second identity platform to use with the second transaction and subsequent transactions of the same user conducted with the second identity platform, the cross-platform electronic token deactivating a second token previously issued to the second identity platform; and denying, by the payment provider server after the cross-platform token has been sent to the first identity platform and to the second identity platform, at least one of the subsequent transactions that involves the deactivated first token or the deactivated second token.

2. The method of claim 1, further comprising determining that the first user is authenticated to use the payment provider server, wherein the generating the cross-platform electronic token is further responsive to the determining that the first user is authenticated to use the payment provider server.

3. The method of claim 1, wherein the comparing is performed at least in part by analyzing first user information stored at a server associated with the first identity platform and analyzing second user information stored at a server associated with the second identity platform.

4. The method of claim 1, wherein the one or more areas of commonality comprises a funding instrument, a transaction domain, a transaction intent, a device identifier, an Internet browser type, or biometric data.

5. The method of claim 1, wherein the plurality of user accounts managed by the payment provider server does not include an account for the second anonymous user.

6. The method of claim 1, wherein:

the first token is replaced by the cross-platform electronic token based on a detection of one or more fraudulent activities involving the first identity user account; or the second token is replaced by the cross-platform electronic token based on a detection of one or more fraudulent activities involving the second identity user account.

7. The method of claim 1, wherein at least one of the first identity platform or the second identity platform comprises a social network.

8. The method of claim 1, further comprising calculating at least one of a risk score associated with the first identity user account or a second risk score associated with the second identity user account, wherein the determining that the first user and the second anonymous user are the same user is performed further based on the first risk score or the second risk score.

9. The method of claim 8, wherein the first risk score or the second risk score is calculated at least in part based on a determination of whether the first identity user account or the second identity user account had an account takeover or an identity theft.

10. The method of claim 8, wherein the first user and the second anonymous user are determined to be the same user when the overall match score meets a threshold, and wherein a value of the threshold is inversely correlated with the first risk score and the second risk score.

11. A payment provider server, comprising:

a non-transitory memory storing instructions; and a processor configured to execute the instructions to cause the payment provider server to:

access first information for a first transaction request from a first identity platform for a first transaction initiated by a first anonymous user and a first merchant, the first information provided via the first identity platform, the first identity platform managing first identity user accounts including a first identity user account for the first anonymous user, the payment provider server managing a plurality of user accounts that are separate from the first identity user accounts the first transaction request including a first token previously issued to the first identity platform;

access second information for a second transaction request from a second identity platform for a second transaction initiated by a second user, the second information provided via the second identity platform, the second identity platform managing second identity user accounts including a second identity user account for the second user, the plurality of user accounts managed by the payment provider server being separate from the second identity user accounts;

compare one or more areas of commonality between the first information and the second information;

calculate an overall match score, wherein the overall match score is based on one or more sub-scores respectively calculated for the compared one or more areas of commonality;

determine, based on the overall match score, that the first anonymous user and the second user are the same user;

responsive to determining that the first anonymous user and the second user are the same, generate a cross-platform electronic token for use by the first identity platform and the second identity platform;

send the cross-platform electronic token to the first identity platform to replace the first token;

send the cross-platform electronic token to the second identity platform to replace a second token associated with the second user;

deactivate the first token and the second token after the cross-platform electronic token has been sent to the first identity platform and the second identity platform;

facilitate the first transaction, the second transaction, or one or more other transactions arising from the first identity platform or the second identity platform based on the cross-platform electronic token; and reject a subsequent transaction on the first identity platform involving the first token or on the second identity platform involving the second token after the first token and the second token have been deactivated.

12. The payment provider server of claim 11, wherein executing the instructions further causes the payment provider server to determine that the first anonymous user is authenticated to use the payment provider server, wherein the cross-platform electronic token is generated further responsive to determining that the first anonymous user is authenticated to use the payment provider server.

13. The payment provider server of claim 11, wherein executing the instructions further causes the payment provider server to analyze first user information stored at a server associated with the first identity platform and second user information stored at a server associated with the second identity platform.

14. The payment provider server of claim 11, wherein the one or more areas of commonality comprises a funding instrument, a transaction domain, a transaction intent, a device identifier, an Internet browser type, or biometric data.

15. The payment provider server of claim 11, wherein:

the first token is replaced by the cross-platform electronic token based on a determination of fraud involving the first identity user account; or the second token is replaced by the cross-platform electronic token based on a determination of fraud involving the second identity user account.

16. The payment provider server of claim 11, wherein at least one of the first identity platform or the second identity platform comprises a social network.

17. A non-transitory machine-readable medium having instructions stored thereon, the instructions executable to cause performance of operations comprising:

managing a plurality of user accounts for a plurality of users including a user;

accessing first information submitted via a first identity platform for a first transaction request associated with a first transaction initiated by a first anonymous user, the first identity platform managing first identity user accounts including a first identity user account for the first anonymous user, the plurality of user accounts being separate from the first identity user accounts, the first transaction request including a first token previously issued to the first identity platform;

receiving a second transaction request from a second identity platform for a second transaction initiated by a second anonymous user, the second identity platform managing second identity user accounts including a second identity user account for the second anonymous user, the plurality of user accounts being separate from the second identity user accounts, wherein the plurality of user accounts does not include an account for the second anonymous user or an account for the first anonymous user, the payment provider server managing second information associated with the second anonymous user and the second transaction, the second information submitted via the second identity platform;

authenticating the user based the second information;

calculating an overall match score between the first information and the second information, the overall match score indicating one or more areas of commonality between the first information and the second information;

determining, based on the calculated overall match score, that the first anonymous user and the second anonymous user are the same user;

responsive to determining that the first anonymous user and the second anonymous user are the same, generating a cross-platform electronic token for use by the first identity platform and the second identity platform;

providing the cross-platform electronic token to the first identity platform to replace the first token; and providing the cross-platform electronic token to the second identity platform to replace a second token associated with the second anonymous user, wherein the cross-platform electronic token is usable with the first transaction and the second transaction, and wherein the deactivated first token and the deactivated second token are unusable after the cross-platform electronic token has been provided to the first identity platform and the second identity platform.

18. The non-transitory machine-readable medium of claim 17, wherein the one or more areas of commonality comprises a funding instrument, a transaction domain, a transaction intent, a device identifier, an Internet browser type, or biometric data.

19. The non-transitory machine-readable medium of claim 17, wherein the plurality of user accounts does not include an account for the second anonymous user.

20. The non-transitory machine-readable medium of claim 17, wherein:

the first token is replaced by the cross-platform electronic token based on a determination of fraud involving the first identity user account; or the second token is replaced by the cross-platform electronic token based on a determination of fraud involving the second identity user account.

* * * * *